United States Patent Office 3,598,871
Patented Aug. 10, 1971

3,598,871
MANUFACTURE OF 1,6-DIALKYLBIUREAS
Charlotte Marie Kraebel, Alexandria, Va., assignor to American Cyanamid Company, Stamford, Conn.
No Drawing. Filed Aug. 6, 1969, Ser. No. 848,105
Int. Cl. C07c *133/02*
U.S. Cl. 260—554                          7 Claims

ABSTRACT OF THE DISCLOSURE 1,6-dialkylbiureas are prepared by the reaction of hydrazine in a solvent with 2.0 to 5.0 moles of a corresponding 1,3-dialkylurea in the presence of from 0.05 to 14.0 moles of water and from 0.03 to 1.2 moles of an acid, by heating the solution in the range 100° C. to 170° C. Useful acids include hydrochloric, sulfuric, phosphoric, p-toluene sulfonic, benzene sulfonic and naphthalene sulfonic acids. The preferred solvents are high boiling ethereal solvents such as diglyme and dioxane. By-product alkylamine is reacted with urea to produce additional 1,3 - dialkylurea, which is recycled to the process.

SUMMARY

This invention relates to a process for the preparation of 1,6-dialkylbiureas from 1,3-dialkylureas and hydrazine. The alkylamine also produced is reacted with urea to produce additional 1,3-dialkylurea, which is recycled to the process.

The manufacture of 1,6-dialkylbiureas has been difficult, particularly those having longer alkyl groups. Attempts to alkylate biurea directly have generally been unsuccessful. The 1,6-dialkylbiureas can be prepared by the reaction of hydrazine with the appropriate carbamoyl chloride or alkyl isocyanate. Such methods are difficult and the starting materials are not in common use, nor readily available economically. U.S. Pat. 3,017,406, discloses the reaction of diethyl hydrazinedicarboxylate with the appropriate alkylamine to produce 1,6-dialkylbiurea. Thus, although several methods are available for the manufacture of 1,6-dialkylbiureas, there is a continuing need for more economical production.

Certain of the 1,6-dialkylbiureas, especially 1,6-di(n-butyl)biurea, are useful intermediates for the manufacture of 1,1'-azobis(N-alkylformamides) used as depolarizers in batteries, see U.S. Pat. 3,357,865 Dry Cells, Davis, Kraebel and Parent, Dec. 12, 1967. U.S. Pat. 2,988,545, Hill, Manufacture of Azodicarbonamide, June 13, 1961 discloses the reaction of urea with hydrazine sulfate to form biurea; there named as hydrazodicarbonamide:

$$2HN_2CONH_2 + N_2H_4 \cdot H_2SO_4 \rightarrow NH_2CONHNHCONH_2 + 2(NH_4)_2SO_4$$

U.S. Pat. 3,227,753 Mehr et al., Manufacture of Biurea, Jan. 4, 1966, discloses a sequence of reactions and conditions to accomplish the same reaction.

The reaction of N-phenylurea with hydrazine to give 4-phenylsemicarbazide is described in Henry Gilman, Organic Syntheses, Collective Volume I, 2nd edition, John Wiley, New York 1941 at page 450. N-phenylurea reacts with hydrazine hydrate in refluxing ethanol to give 1,6-diphenylbiurea.

It is surprising that the alkylureas are different in their behavior. A mono-alkylurea and hydrazine gives mixtures which are difficult to separate or identify.

It has now been found that 1,6-dialkylbiureas in which the alkyl substituent has 1 to 12 carbon atoms can be prepared in good yield from the corresponding 1,3-dialkylurea and hydrazine by conducting the reaction at a moderately high temperature in a high boiling solvent in the presence of an acid and water. This provides an economical route to 1,6 - dialkylbiureas, having alkyl groups of 1 to 12 carbons.

For purposes of convenience, reactions and examples are given in which both of the alkyl groups on the starting dialkyl urea are the same. Ureas can be used which are not symmetrical, and mixtures of symmetrical and unsymmetrical ureas can be used. The resulting dialkylbiureas produced contain some of all of the alkyl groups in the reaction mixture, with a variety of alkylamines being also produced. The use of such mixed alkyl groups is usually without advantages, and hence such mixed compounds are not produced. Where comparative rates of reaction are to be studied, or different groups are to be used as tracers, or as starting materials for reactions with unsymmetrical alkyl groups desired in an end product, or for blowing agents with multi-varied effective temperatures, such mixed alkyl groups offer additional versatility to the reaction, and an interesting increase in the number of different closely related compounds. The present novel process has the advantage of using starting materials which can be easily prepared from readily available and inexpensive intermediates.

It has the additional advantage that the alkyl amine formed as a by-product can be recovered and recycled to make additional 1,3 - dialkylurea, as a starting material.

The reaction between hydrazine and a 1,3-dialkylurea, is represented as:

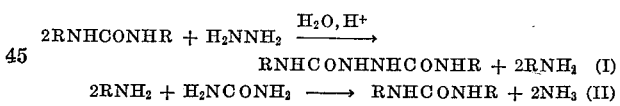

The reaction is most efficient in a moderately high boiling solvent at a temperature between about 100° C. and 170° C. in the presence of acid and water.

Useful high boiling solvents included diglyme (dimethyl ether of diethylene glycol, $$CH_3OCH_2CH_2OCH_2CH_2OCH_3)$$

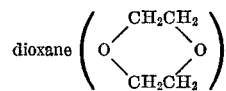

monochlorobenzene, anisole, cumene, o-dichlorobenzene, diethyl Carbitol (diethylene glycol diethyl ether, $(C_2H_5OCH_2CH_2)_2O)$ methyl Cellosolve (2-methoxyethanol, $HOCH_2CH_2OCH_3)$ xylene, butyl Cellosolve (2-butoxyethanol, $HOCH_2CH_2OC_4H_9)$ and the like. The ethereal solvents are preferred, particularly diglyme and dioxane or mixtures of the two.

The amount of the solvent can vary over wide limits. Normally from about 16 ml. to about 100 ml. are used per millimole of hydrazine, but more or less may be used depending on equipment available.

The reaction does proceed much more effectively in the presence of an acid. The type and quantity of acid is important for best results. The preferred catalytic acids include strong mineral acids; hydrochloric acid, sulfuric acid, phosphoric acid, pyrophosphoric acid and strong aromatic sulfonic acids, such as benzene sulfonic acid, toluene sulfonic acid and naphthalene sulfonic acids. Hydrochloric acid is preferred. The acid may be added directly, or at least in part, as hydrazine hydrochloride or hydrazine sulfate, or other acid salt. The amount of the acid effective is from about 0.03 mole to about 1.2 moles per mole of hydrazine, preferably from about 0.03 to about 0.6 mole per mole of hydrazine.

The reaction does not readily proceed in water alone nor does it proceed adequately in its absence. A part or all of the water may be added in the form of hydrazine hydrate, wet (95%) hydrazine, or aqueous acid. It may be added directly to the reaction mixture in the desired amount. The amount of water ranges from about 0.05 mole to 14.0 moles per mole of hydrazine, preferably from about 0.1 to about 4 moles per mole of hydrazine.

The temperature of the reaction is important. Below about 100° C. the reaction is uneconomically slow, and yields tend to be low. At temperatures above about 170° C. product decomposition begins. Temperatures from about 140° C. to about 160° C. are preferred. The temperature must be limited to reflux temperatures, although pressure vessels may be used to increase the reflux temperature. Hydrazine may be introduced as anhydrous hydrazine, wet (95%) hydrazine, hydrazine sulfate, or other acid salt. When hydrazine hydrochloride or hydrazine sulfate is used, the acid part of the salt provides part or all of the acid required.

A preferred form is hydrazine hydrate, which is readily commercially available at 99–100% purity.

The 1,3-dialkylureas used are conveniently symmetrically disubstituted. The process is applicable to the preparation of unsymmetrically disubstituted biureas or mixtures of the symmetrically disubstituted biureas. The 1,3-dialkylureas of use in this process include those whose alkyl groups contains 1 to 12 carbon atoms, straight, or branched chain such as dimethyl, diethyl, di-n-propyl, diisopropyl, diisobutyl, di-n-pentyl, diisopentyl, di-n-hexyl, di-n-heptyl, di-n-octyl, dinonyl, didecyl, didodecyl, and the like.

Alkyl groups of from about 4 to 8 carbon atoms on the urea, particularly 1,3-di(n-butyl)urea, producing corresponding 4 to 8 carbon biureas, such as 1,6-di(n-butyl)-biurea, are compounds of particular interest for electric cells.

The 1,3-dialkylurea is used in an amount from about 2.0 to about 5.0 moles per mole of hydrazine, preferably from about 2.0 to about 3.0 moles per mole of hydrazine.

The reaction mixture is heated in the high boiling solvent for from 2 to 40 hours. The product is insoluble in the solvent and precipitates. When the reaction is completed, the product is recovered by filtration, washed with a solvent, such as ethanol, and dried. The by-product alkylamine may be recovered from the solvent and converted to the corresponding 1,3-dialkylurea, which conveniently is fed into the synthesis on subsequent runs.

Specific illustrations of the invention are set forth in the following examples, in which moles are gram moles, temperatures are ° C. and parts are by weight unless otherwise clearly set forth.

EXAMPLE 1

Preparation of 1,6-di(n-butyl)biurea

A mixture of 0.10 mole of 1,3-di(n-butyl)-urea, 0.02 mole of hydrazine (95%), 0.012 mole of concentrated hydrochloric acid (36%) and 100 ml. diglyme was refluxed at about 160° C. for 4 hours.

The product 1,6-di(n-butyl)biurea was filtered from the mixture and then reslurried in ethanol until obtained as a free flowing white powder. There was obtained a 40% yield of 1,6-di(n-butyl)biurea.

Slurrying 4 times in 50 ml. portions usually results in a free flowing white powder which is pure. As the 1,6-di(n-butyl)biurea is very insoluble in ethanol, and nearly all other solvents, a wide choice of solvents maybe used and in relatively large quantities to insure that the product as obtained is pure, and may be used directly if convenient or ground to any desired size. In the coarse form as well as in the fine form the product may be used as a blowing agent with the degree of subdivision being appropriate to the blowing action required.

The 1,3-di(n-butyl)urea which does not appear in the product is essentially unreacted. Nearly all of the 1,3-di(n-butyl)urea may be recovered as either the desired product or unreacted starting material.

Rather uniquely the crystal form of the 1,6-di(n-butyl)biurea obtained on synthesis is different from the form obtained in discharging a cell, but both forms work satisfactorily in a cell. The one form in making an uncharged cel, to be charged, the other on recharging.

EXAMPLE 2

The reaction of Example 1 was repeated using 100 ml. of a mixture of equal amounts of diglyme and dioxane, with reflux at about 110° C. for 21 hours. There was obtained a 50% yield of 1,6-di(n-butyl)biurea.

EXAMPLE 3

A reaction was conducted using 0.05 mole of 1,3-di(n-butyl)urea, other conditions being the same as in Example 1, but refluxing for 10 hours at 160° C. 1,6-di(n-butyl)biurea was obtained in 40% yield.

EXAMPLES 4–27

A series was run to illustrate the effect of variables on the process. These runs are summarized in Table I. Examples 9 and 21 show the low yields without water. Examples 4 and 5 show the lower yields at lower temperatures. Other examples show the use of hydrazine hydrate (22–24), hydrazine sulfate (13), hydrazine hydrochloride, p-toluene sulfonic acid (14), acetic acid (15), phosphoric acid (23), sulfuric acid (24), and various solvents and acid and water concentrations.

Also produced in the reactions is n-butylamine, which has a strong odor, and is volatile (B.P. 78° C.). If the reflux condenser is very efficient, the n-butylamine is condensed, and retained in the reaction vessel. It can be distilled off during or after the reaction, or distilled out of the filtrate. The n-butylamine is reacted with urea to form 1,3-di(n-butyl)urea for subsequent recycling to the process, where the reaction is on a scale large enough to warrant recovery.

TABLE 1

| Examples | 1,3-di(n-butyl) urea, moles | Reagent | Moles | Solvent | Temp., °C | Time, hrs. | Results |
|---|---|---|---|---|---|---|---|
| 4 | 0.05 | Hydrazine sulfate / Water | 0.02 / 0.01 | THF | Reflux (66) | 16 | No 1,6-di(n-butyl)-biurea (DBB) |
| 5 | 0.05 | 95% hydrazine / Conc. HCl | 0.01 / 0.012 | Dioxane | Reflux (100) | 24 | 19% DBB. |
| 6 | 0.10 | Hydrazine·HCl / Water | 0.02 / 0.01 | Dioxane-diglyme (1/1) | 118 | 18 | 22% DBB. |
| 7 | 0.05 | Hydrazine·HCl / Water | 0.02 / 0.01 | Diglyme-MCB (1:1) | Reflux | 20.5 | 33% DBB. |
| 8 | 0.05 | Hydrazine·HCl / Water | 0.02 / 0.01 | Anisole | 150 | 4.25 | 37% DBB. |
| 9 | 0.25 | 95% hydrazine | 0.063 | Methyl Cellosolve | 125 / 125 | 16 / 88 | No reaction. / About 1% DBB. |
| 10 | 0.05 | 95% hydrazine / Conc. HCl | 0.02 / 0.012 | Methyl Cellosolve | 125 | 72 | 11% DBB. |
| 11 | 0.05 | Hydrazine·HCl / Water | 0.02 / 0.01 | MCB | Reflux (130) | 20.5 | 32% DBB. |
| 12 | 0.05 | Hydrazine·HCl / Water | 0.02 / 0.01 | Xylene | Reflux (135) | 27 | 21% DBB. |
| 13 | 0.05 | Hydrazine sulfate / Water | 0.02 / 0.01 | Diglyme | Reflux (160) | 4 | 46% DBB. |
| 14 | 0.05 | Hydrazine·HCl / p-TSA·H₂O | 0.01 / 0.01 | Diglyme | Reflux (160) | 3.75 | 24% DBB. |
| 15 | 0.05 | 95% hydrazine / Acetic acid | 0.02 / 0.017 | Diglyme | Reflux (160) | 4 | 15% DBB. |
| 16 | 0.25 | 95% hydrazine | 0.063 | Diglyme | Reflux (160) | 16 / 88 | No reaction. / About 3% DBB. |
| 17 | 0.05 | Hydrazine·H₂O | 0.02 | Diglyme | Reflux (160) | 4 | 12% DBB. |
| 18 | 0.05 | Hydrazine·HCl / 95% hydrazine | 0.01 / 0.01 | Diglyme | Reflux (160) | 4 | 12% DBB. |
| 19 | 0.05 | 95% hydrazine / Conc. HCl | 0.02 / 0.0006 | Diglyme | Reflux (160) | 4 | 15% DBB. |
| 20 | 0.05 | Hydrazine·HCl / Water | 0.02 / 0.28 | Diglyme | Reflux (160) | 5 | 14% DBB. |
| 21 | 0.05 | Hydrazine·HCl | 0.02 | Diglyme | Reflux (160) | 17.5 | Less than 1% DBB. |
| 22 | 0.04 | Hydrazine·H₂O / Conc. HCl | 0.02 / 0.006 | Diglyme | Reflux (160) | 3.8 | 26% DBB. |
| 23 | 0.05 | Hydrazine·H₂O / P₂O₅ / Water | 0.02 / 0.025 / 0.02 | Diglyme | Reflux (160) | 3.8 | 33% DBB. |
| 24 | 0.05 | Hydrazine·H₂O / Conc. H₂SO₄ | 0.02 / 0.009 | Diglyme | 160 | 3.8 | 26% DBB. |
| 25 | 0.05 | 95% hydrazine / Conc. HCl | 0.02 / 0.012 | Diglyme | 140 | 20.5 | 29% DBB. |
| 26 | 0.05 | 95% hydrazine / Conc. HCl | 0.02 / 0.024 | Diglyme | 160 | 2 | 22% DBB. |
| 27 | 0.05 | Hydrazine·HCl / 95% hydrazine | 0.015 / 0.005 | Diglyme | 160 | 20 | 1% DBB. |

NOTE: THF=Tetrahydrofuran; MCB=Monochlorobenzene; p-TSA=Para-toluene sulfonic acid.

EXAMPLES 28

Preparation of 1,6-di(n-hexyl)biurea

A mixture of 11.4 grams (0.05 mole) of 1,3-di(n-hexyl) urea, 1.0 gram (0.02 mole) or hydrazine hydrate, 1.0 ml. (0.012 mole) of conc. hydrochloric acid, and 100 ml. diglyme was stirred and heated under reflux for 4 hours. The white solid obtained was filtered, washed with ethanol, and dried, giving an 8% yield of 1,6-di(n-hexyl) biurea, dec. 238–42° C.

EXAMPLE 29

Preparation of 1,6-di(n-octyl)biurea

A mixture of 2.8 g. (0.01 mole) of 1,3-di(n-octyl)urea, 0.2 g. (0.004 mole) of hydrazine hydrate, and 0.2 ml. (0.0024 mole) of conc. hydrochloric acid in 20 ml. of diglyme was heated under reflux and stirred for 5 hours. The product, 1,6-di(n-octyl)biurea, was isolated by filtration and washed with ethanol. The yield was 0.20 g. (14%).

I claim:
1. A process for the manufacture of a 1,6-dialkylbiurea from hydrazine and a 1,3-dialkylurea which comprises:
    forming a solution in an organic solvent of hydrazine and from about 2.0 to about 5.0 moles per mole of hydrazine of a 1,3-dialkylurea, the alkyl groups therein each having from 1 to 12 carbon atoms,
    from about 0.05 to about 14.0 moles of water per mole of hydrazine,
    from 0.03 to about 1.2 moles per mole of hydrazine of an acid selected from the group consisting of hydrochloric acid, sulfuric acid, acetic acid, phosphoric acid, p-toluene sulfonic acid, benzene sulfonic acid, and the naphthalene sulfonic acids, and
    heating said solution to between about 100° C. and about 170° C. for from about 2 to about 40 hours, thereby reacting to form 1,6-dialkylbiurea, said alkyl groups each containing from 1 to 12 carbon atoms.

2. The process of claim 1 in which the ratio of hydrazine is from 2.0 to 3.0 moles per mole of the 1,3-dialkylurea.

3. The process of claim 2 in which the ratio of water from about 0.1 to 4.0 moles per mole of hydrazine.

4. The process of claim 3 in which the alkyl groups have from 4 to 8 carbon atoms.

5. The process of claim 4 in which the solvent is diglyme or dioxane, or a mixture thereof.

6. The process of claim 5 in which the acid is hydrochloric.

7. The process of claim 6 in which the mixture is heated to between 140° C. and 160° C. for 4 to 6 hours.

References Cited

UNITED STATES PATENTS 2,692,281   10/1954   Newby et al. _____ 260—554
2,855,432   10/1958   Grillot et al. _____ 260—554

BERNARD HELFIN, Primary Examiner

M. W. GLYNN, Assistant Examiner

U.S. Cl. X.R.

260—583J, 583R